(12) United States Patent
Kuhlmann

(10) Patent No.: US 10,494,076 B2
(45) Date of Patent: Dec. 3, 2019

(54) LIGHTER-THAN-AIR AIRCRAFT AND DEBALLASTING METHOD IMPLEMENTED IN SAID LIGHTER-THAN-AIR AIRCRAFT

(71) Applicant: FLYING WHALES, Paris (FR)

(72) Inventor: Hervé François Kuhlmann, Montrouge (FR)

(73) Assignee: FLYING WHALES, Suresnes (FR)

( * ) Notice: Subject to any disclaimer, the term of this patent is extended or adjusted under 35 U.S.C. 154(b) by 82 days.

(21) Appl. No.: 15/504,857

(22) PCT Filed: Aug. 11, 2015

(86) PCT No.: PCT/EP2015/068496
§ 371 (c)(1),
(2) Date: Feb. 17, 2017

(87) PCT Pub. No.: WO2016/026739
PCT Pub. Date: Feb. 25, 2016

(65) Prior Publication Data
US 2017/0267326 A1    Sep. 21, 2017

(30) Foreign Application Priority Data
Aug. 21, 2014    (FR) ...................................... 14 57925

(51) Int. Cl.
B64B 1/70    (2006.01)
B64D 1/18    (2006.01)

(52) U.S. Cl.
CPC . B64B 1/70 (2013.01); B64D 1/18 (2013.01)

(58) Field of Classification Search
CPC .... B64B 1/70; B64B 1/62; B64B 1/64; B64B 1/18
See application file for complete search history.

(56) References Cited

U.S. PATENT DOCUMENTS

| 1,679,564 A | * | 8/1928 | Doerr | B64B 1/62 244/128 |
| 1,686,084 A | * | 10/1928 | Hall | B64B 1/62 244/97 |
| 1,792,926 A | | 2/1931 | Pupp | |
| 2,180,036 A | * | 11/1939 | Dardel | B64B 1/62 244/97 |
| 4,457,477 A | | 7/1984 | Regipa | |
| 2008/0011900 A1 | * | 1/2008 | Quintana | B64B 1/30 244/30 |

FOREIGN PATENT DOCUMENTS

| DE | 10252908 | * 11/2002 | ............... B64B 1/70 |
| DE | 10252908 A1 | 5/2004 | |

OTHER PUBLICATIONS

English Translation of DE10252908.*
French Search Report from French Patent Application No. 1457925, dated Apr. 30, 2015.
International Search Report from International Patent Application No. PCT/EP2015/068496, dated Oct. 13, 2015.

* cited by examiner

*Primary Examiner* — Philip J Bonzell
(74) *Attorney, Agent, or Firm* — Greer, Burns & Crain, Ltd.

(57) ABSTRACT

A lighter-than-air aircraft is provided including a deballasting system, the deballasting system including: at least one tank containing a liquid; a system for pressurizing the liquid of the at least one tank; and at least one sprayer arranged so as to eject the liquid from the pressurization system.

11 Claims, 3 Drawing Sheets

LIGHTER-THAN-AIR AIRCRAFT AND DEBALLASTING METHOD IMPLEMENTED IN SAID LIGHTER-THAN-AIR AIRCRAFT

BACKGROUND

The present invention relates to a lighter-than-air aircraft. It also relates to a deballasting method implemented in a lighter-than-air aircraft.

Such a device or method makes it possible for a user to proceed to deballasting. The field of the invention is more particularly, but non-limitatively, that of dirigible balloons.

Historically, ballasting and deballasting have been carried out by means of sandbags, birdshot, lead or water.

Technological developments and new requirements are resulting in the re-emergence of opportunities for the use of dirigibles.

The laws of aerostatics mean that the dirigible must always be close to equilibrium, and if during flight the latter must pick up a load, then there must be an exchange of weight in order to maintain its equilibrium. If the balloon loads several tonnes of freight it must jettison several tonnes of ballast.

Within the context of the use of water as a ballasting system, the latter must be drained during loading. If the loading operation takes place in flight (in principle in an almost static position), and when large volumes of water are involved, it may prove impossible to release this water below the dirigible, due to:
  possible difficulties in recovering this water,
  or, if the water is discharged and is not recovered, as a result of:
    possible problems with water drainage, or
    soil erosion, or
    safety of the teams on the ground.

The purpose of the present invention is to overcome this impossibility.

SUMMARY

This objective is achieved with a lighter-than-air aircraft comprising deballasting means, the deballasting means comprising:
  at least one tank containing a liquid,
  a system for pressurizing the liquid of the at least one tank,
  at least one sprayer, arranged in order to expel the liquid originating from the pressurization system out of the lighter-than-air aircraft.

The pressurization system can comprise:
  at least one pump arranged in order to pump the liquid out of the at least one tank, and/or
  the at least one tank comprising the liquid stored under pressure with respect to the external environment of the lighter-than-air aircraft.

The at least one sprayer is preferably arranged in order to expel the liquid in a direction of spraying:
  comprising a non-zero horizontal component, and/or
  comprising a non-zero vertical component directed upwards.

Each sprayer is preferably equipped:
  with a flow-rate adjuster arranged in order to adjust a flow rate of the liquid expelled by this sprayer, and/or
  a direction adjuster arranged in order to adjust a direction of spraying of the liquid expelled by this sprayer.

The lighter-than-air aircraft according to the invention preferably comprises means for controlling each flow-rate adjuster and/or each direction adjuster according to commands for the adjustment of a spatial position of the lighter-than-air aircraft.

The lighter-than-air aircraft according to the invention preferably comprises at least one pair of sprayers, each pair of sprayers comprising a first sprayer arranged in order to expel the liquid in a first direction of spraying comprising a horizontal component and a second sprayer arranged in order to expel the liquid in a second direction of spraying comprising a horizontal component, the horizontal components of the first and second directions of spraying being opposite (and preferably carried on one and the same axis). The first and second directions of spraying can be opposite and carried on one and the same axis.

The lighter-than-air aircraft preferably comprises several tanks 2, and preferably also comprises means for transferring liquid from one tank to another tank.

According to yet another aspect of the invention, a deballasting method is proposed that is implemented in a lighter-than-air aircraft comprising at least one tank containing a liquid, said method comprising:
  pressurizing the liquid of the at least one tank, by a pressurization system
  expelling the liquid originating from the pressurization system out of the lighter-than-air aircraft, via at least one sprayer.

The pressurizing can comprise:
  pumping the liquid out of the at least one tank, and/or
  storing the liquid, under pressure (with respect to the external environment of the lighter-than-air aircraft) in the at least one tank comprising.

The expulsion by the at least one sprayer preferably comprises an expulsion of the liquid in a direction of spraying:
  comprising a non-zero horizontal component, and/or
  comprising a non-zero vertical component directed upwards.

The method according to the invention preferably comprises:
  adjusting a flow rate of the liquid expelled by the at least one sprayer, and/or
  adjusting a direction of spraying of the liquid expelled by the at least one sprayer.

The method according to the invention preferably comprises a control of the adjustment of the flow rate of the liquid expelled by the at least one sprayer and/or of the adjustment of the direction of spraying of the liquid expelled by the at least one sprayer according to commands for the adjustment of a spatial position of the lighter-than-air aircraft.

The at least one sprayer can comprise at least one pair of sprayers, each pair of sprayers comprising a first sprayer expelling the liquid in a first direction of spraying comprising a horizontal component and a second sprayer expelling the liquid in a second direction of spraying comprising a horizontal component, the horizontal components of the first and second directions of spraying being opposed (and preferably carried on one and the same axis). The first and second directions of spraying can be opposite and carried on one and the same axis.

The at least one tank can comprise several tanks, and the method according to the invention can comprise a transfer of the liquid from one tank to another tank.

BRIEF DESCRIPTION OF THE DRAWINGS

Other advantages and characteristics of the invention will become apparent on examination of the detailed description of implementations and embodiments which are in no way limitative, and the attached drawings, in which.

DETAILED DESCRIPTION

Figure 1:
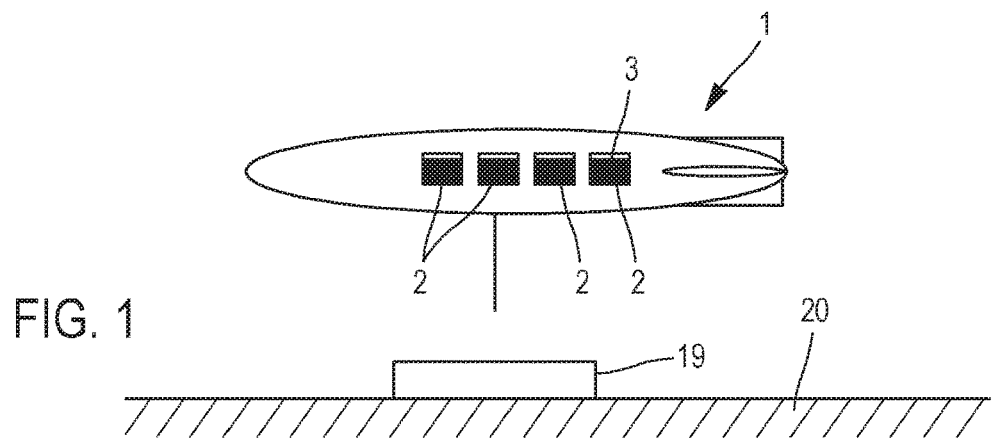
FIGS. 1 to 8 are different diagrammatic views of a first embodiment of the lighter-than-air aircraft 1 according to the invention (which is the preferred embodiment of the invention), implementing different steps of a method according to the invention, FIGS. 1, 2 and 4 being profile views, FIGS. 3, 5, 6, 7 and 8 being top views.
Figure 2:
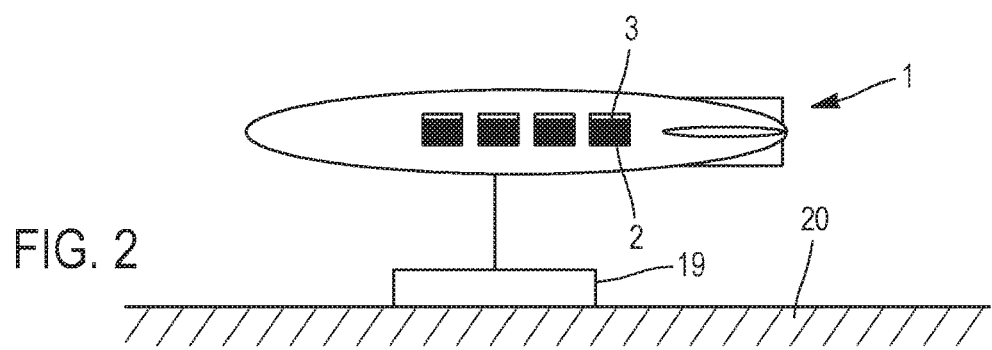

As these embodiments are in no way limitative, variants of the invention can be considered, comprising only a selection of the characteristics described or shown hereinafter, in isolation from the other characteristics described or shown (even if this selection is isolated within a phrase comprising these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention with respect to the state of the prior art.

Firstly, with reference to FIGS. 1 to 10, a first embodiment of a lighter-than-air aircraft 1 according to the invention implementing an example of the method according to the invention will be described.

The lighter-than-air aircraft 1 is for example intended for the extraction and transport of tree trunks for the wood industry.

The lighter-than-air aircraft 1 comprises deballasting means.

By "lighter-than-air aircraft" is meant any appliance the lift of which is provided by a gas lighter than the ambient air surrounding this appliance, i.e. preferably a balloon or a dirigible.

In this non-limitative example, the lighter-than-air aircraft 1 used is a dirigible having a load capacity of sixty tonnes distributed over sixteen independent winches. This lighter-than-air aircraft 1 has a length of 150 metres and a diameter of 45 metres, for a displacement volume of 180,000 m$^3$. It is a rigid dirigible, its structure is made from carbon beams clad with a textile that can withstand attack by the atmosphere (typically a polyester web coated with a polyfluorinated layer such as polyvinyl fluoride or Tedlar) enclosing 9 helium cells (lifting gas lighter than air) for a total volume of helium of approximately 110,000 m$^3$. This example is given by way of indication only, as the invention can be utilized based on any lighter-than-air aircraft structure known to a person skilled in the art.

The deballasting means comprise at least one tank 2 containing a liquid 3.

The liquid 3 comprises (preferably consists of) water.

The lighter-than-air aircraft 1 is equipped with sixteen tanks 2 (for reasons of clarity, only four tanks 2 are shown in the diagrammatic figures) of 4,000 litres each (with approximate diameter one metre, height six metres) each equipped with a three-inch diameter quarter-turn solenoid valve (reference 13), connected together by three-inch diameter rigid tubes 14.

The deballasting means also comprise a pressurization system 4, 5, 6 of the liquid 3 of the at least one tank 2.

Deballasting means also comprise at least one sprayer 7 (preferably at least four).

Each sprayer 7 is arranged in order to expel the liquid 3 originating from the pressurization system 4 out of the lighter-than-air aircraft 1.

Each tank 2 is therefore equipped with a valve 13. Managing the opening of the valves 13 makes it possible to adjust the quantity of liquid 3 in each tank 2 and as a result to adjust the longitudinal attitude of the lighter-than-air aircraft 1. This liquid 3 is then conveyed through piping 16 to the sprayers 7 and is propelled in the form of a sprayed or diffused jet 17.

By "in sprayed form" or "in the form of a sprayed jet" of liquid is preferably meant ejecting or diffusing a liquid, not in the form of a continuous jet of liquid, but a jet of droplets (typically microdroplets) of liquid without fluid continuity between them, the size of which (i.e. the diameter in an ideal spherical case or more generally, in any case, the greatest distance capable of measurement between two points of a single drop) is comprised between 1 micrometre (or 10 micrometres, or 50 micrometres) and 5 millimetres (preferably 1 millimetre, ideally 100 micrometres).

The sprayed form or the sprayed jet form is a consequence of the ejection of the liquid 3 (water) under pressure by a sprayer 7 typically comprising a straight nozzle through which the jet will be diffused, due to the instability of the sprayed liquid 3 after a certain distance, before touching the ground 20. For example, under a pressure of 7 bars and an initial angle of the jet of 30° above the horizontal, 3,000 litres per minute are sprayed to a distance of 65 metres with a Mastermatic 4,500 straight nozzle adjusted to 3,000 l/mn. A pressure of 8 bars makes it possible to diffuse the liquid 3 up to 90 m horizontal distance. This same type of head has a fog position and sprays the same 3,000 l/mn to a distance of 25 metres in the form of microdroplets.

Thus, the lighter-than-air aircraft 1 comprises means 4, 5, 6, 7 making it possible to spray the liquid 3 beyond a certain radius of action around the lighter-than-air aircraft 1 such that on the ground 20 this liquid 3 arrives in the form of a fine rain with no further risk of erosion and without further risk to personnel on the ground than for normal rainfall, especially since a large part of this liquid 3 can be solubilized in the air or be blown away by the wind.

Moreover, using water as liquid 3 has the advantage of being non-polluting.

Each sprayer 7 is equipped with a flow-rate adjuster 8 arranged in order to adjust a flow rate of the liquid 3 sprayed by this sprayer 7.

Each sprayer 7 is equipped with a direction adjuster 9 arranged in order to adjust a direction of spraying of the liquid 3 sprayed by this sprayer 7.

Thus, each sprayer 7 is constituted by:
a valve 8 that controls its flow and
an orientation system 9 making it possible to orient its jet 17 and therefore its force vector.

The pressurized liquid 3 is conveyed to the sprayers 7.

Each sprayer 7 comprises a nozzle of the Mastermatic ER 4500 type mounted on an electrically controlled spray cannon of the Hurricane type from the Leader group, with flow rate adjustment, the direction of which can be oriented at approximately 50°.

The lighter-than-air aircraft 1 according to the invention comprises means for controlling each flow-rate adjuster 8 and/or each direction adjuster 9 according to commands for the adjustment of a spatial position of the lighter-than-air aircraft 1. These control means can comprise:
mechanical means (manual control means such as for example a pilot-controlled manual steering wheel, gearing, etc.), and/or electronic means (such as a computer, a central processing or calculation unit, an analogue electronic circuit (preferably dedicated), a digital electronic circuit (preferably dedicated) and/or a microprocessor (preferably dedicated)), and/or software means, and/or at least one sensor (for example a wind and/or position sensor).

These control means can be arranged in order to take account of:

a manual position adjustment control (for example a steering wheel turned by a pilot) and/or data (preferably originating from at least one sensor; for example wind strength and/or direction data, generating adjustment commands intended to compensate for the effect of this wind on the lighter-than-air aircraft 1), these data preferably being calculated automatically by the electronic and/or software means.

Moreover, the control means are arranged in order to control an expulsion of a certain weight of liquid 3 (calculated by the control means) by the at least one sprayer 7 according to the weight of a load 19 (preferably so that the weight of the liquid expelled is equal to the weight of the load 19).

With regard to the pressurization system 4, 5, 6 of the liquid, two variants of pressurization are envisaged.

Figure 9:
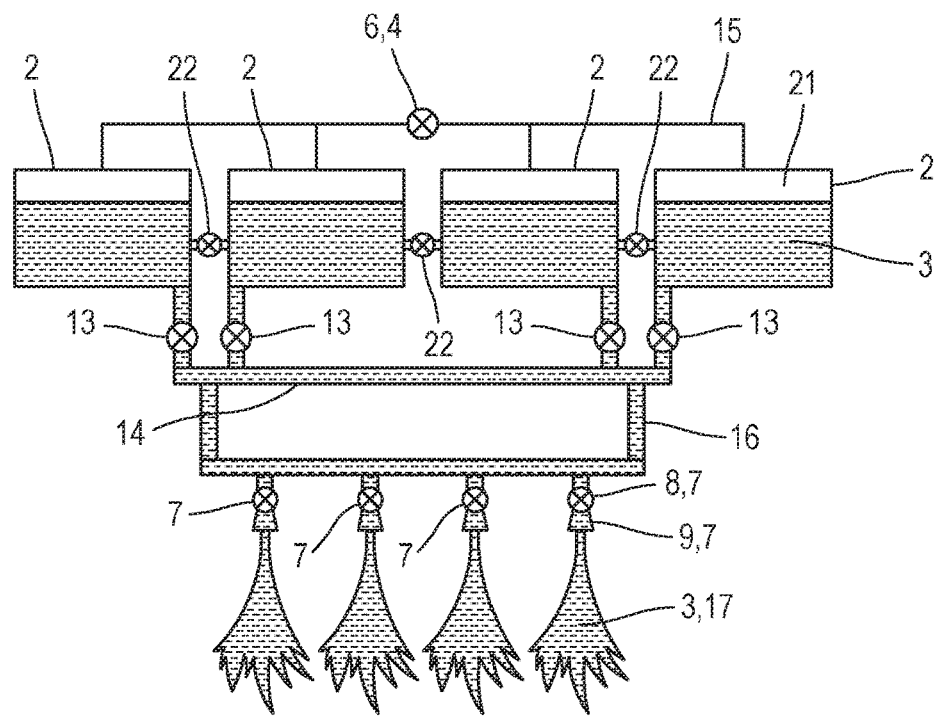
FIGS. 9 and 10 are diagrammatic views of two variants of the hydraulic circuit within this lighter-than-air aircraft 1.

With reference to FIG. 9, a first variant of pressurization will now be described.

In this first variant, the pressurization system 4 comprises the at least one tank 2 which allows the pressurization of the liquid 3 of the order of several bars, using a compressor 6, or pressurization by filling the at least one tank 2 with the liquid 3.

The pressure of the air or gas 21 inside each tank 2 above the liquid 3 is greater than the environmental pressure around the lighter-than-air aircraft 1, i.e. typically greater than atmospheric pressure.

The pressurization system 4 is arranged in order to put the liquid 3 under pressure directly inside each tank 2.

The pressurization system 4 comprises the at least one tank 2 and means 6 (the compressor) arranged in order to store the liquid 3, in the at least one tank 2, under pressure with respect to the external environment of the lighter-than-air aircraft 1. In the case of the tank 2 under pressure (FIG. 9), once the liquid 3 (water) is stored in the various tanks 2 distributed in the lighter-than-air aircraft 1, each tank 2 is pressurized by the compressor 6 through piping 15.

Figure 10:
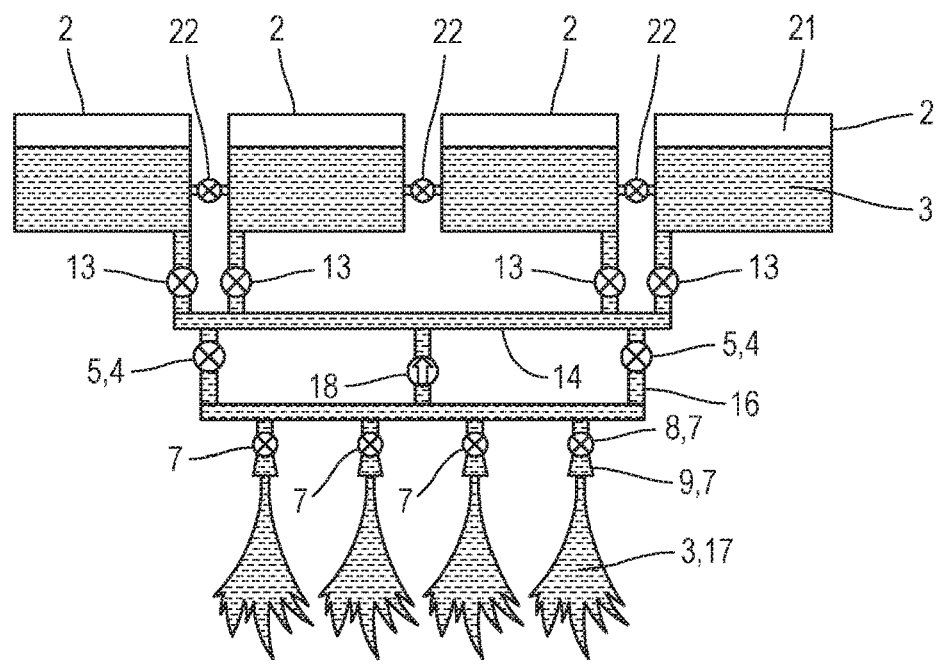

With reference to FIG. 10, a second variant embodiment of pressurization will now be described, which can optionally be combined with the first variant.

The pressurization system 4 comprises at least one pump 5 arranged in order to pump the liquid 3 out of the at least one tank 2.

In this second variant, the pressurization is carried out by the water pumps 5 actuated by electric or hydraulic motors or heat engines.

In this case the associated tanks 2 do not have a structural requirement to withstand pressurization (unless they are combined with the first variant); they are at ambient pressure.

The pressure of the air or gas 21 inside each tank 2 above the liquid 3 is equal to the environmental pressure around the lighter-than-air aircraft 1, i.e. typically equal to atmospheric pressure.

The pressurization system 4 is arranged in order to put the liquid 3 under pressure at the outlet of the at least one tank 2 (typically in the pipes 14 and 16) along the circuit conveying the liquid 3 between the at least one tank 2 and the at least one sprayer 7.

In the case of the pressurization by pump in FIG. 10, the liquid 3 (water) is stored in the various tanks 2 distributed in the lighter-than-air aircraft 1. The liquid 3, released by opening the valves 13, is pressurized by the at least one pump 5 (preferably several pumps 5 for safety reasons). In the case of closure of all the valves 8, a valve 18 makes it possible to discharge the excess pressure (upstream of the or each pump 5). Typically, all of the tanks 2 are connected via this piping 14, 16 to two turbine centrifugal motor pumps 5 of the EN 22858 type driven by a 60 kW synchronous electric motor at 2,500 rpm mounted in parallel. At the outlet of each turbine a pressure regulator is located, powered by the motors. The operating pressure is between 5 and 8.5 bars.

With reference to FIGS. 1 to 10, various steps of an example of the method according to the invention will be described, implemented in the lighter-than-air aircraft 1.

With reference to FIG. 1, when the lighter-than-air aircraft 1 comes to collect the load 19 placed on the ground 20, the lighter-than-air aircraft is at equilibrium, its apparent weight is zero.

Once attached to its load 19 (FIG. 2), the lighter-than-air aircraft 1 weighs the weight of its load 19.

In order to return to equilibrium, i.e. to have an apparent weight of zero, it must lose weight to the equivalent of the weight of the load 19 by spraying the ballasting liquid 3 (FIG. 3) which is on board in at least one tank 2. This spraying is carried out using one or more turbines or pumps 5 or compressors 6 as previously described. This pressurized liquid 3 is expelled in spray form through one or more sprayers 7.

Thus the deballasting method implemented in this lighter-than-air aircraft 1 comprises:

pressurizing the liquid 3 of the at least one tank 2, by the pressurization system 4, 5, 6 expelling the liquid 3, originating from the pressurization system, in spray form out of the lighter-than-air aircraft 1, via the at least one sprayer 7.

The pressurizing can comprise, according to the variant in question:

storing the liquid 3 in the at least one tank 2, under pressure with respect to the external environment of the lighter-than-air aircraft 1, and/or pumping the liquid 3 out of the at least one tank 2 by the at least one pump 5.

The weighing is carried out on each winch at the fastening of the pulley wheel situated in the upper part of the hold of the lighter-than-air aircraft 1, the information being given by a load pin which captures the force generated by the weight lifted at the winch. A tank 2 is allocated to each winch and is located directly above each load, so that the weight and moment are therefore exactly compensated for.

In this lighter-than-air aircraft 1 comprising several tanks 2, the lighter-than-air aircraft 1 comprises means (reversible pumps 22) for transferring liquid 3 from one tank 2 to another tank 2. The pilot of the lighter-than-air aircraft 1 is very significantly affected by a longitudinal loss of equilibrium due to a change in the attitude of the lighter-than-air aircraft 1, and can transfer the desired quantity of liquid 3 from one tank 2 to the other independently of the ballast circuit, thus re-establishing equilibrium (for example by one or more pump(s) 22).

If equilibrium cannot be achieved by the transfer of liquid 3 (for example if all the liquid 3 has been deballasted), the pilot can also take action with respect to the distribution of helium in the different lifting gas cells of the lighter-than-air aircraft 1.

Once this liquid 3 has been discharged (FIG. 4), the lighter-than-air aircraft 1 is again at equilibrium, therefore with zero apparent weight, and it can therefore fly again, with its load 19, and carry it to the transhipment site where the lighter-than-air aircraft 1 will exchange its cargo for the equivalent by mass of liquid 3 which will be stored in the at least one tank 2.

The lighter-than-air aircraft 1 can then leave again for another round trip.

During these different steps that have just been described with reference to FIGS. 1 to 4, the position control of the lighter-than-air aircraft 1 during loading is crucial and must be accurate.

The additional thrust due to the spraying of the liquid 3 is significant and:
  must therefore be compensated in order to limit disturbances of the positioning of the lighter-than-air aircraft 1 ("symmetrical" use of the sprayers 7) and/or
  can be used in order to assist the positioning ("non-symmetrical" use of the sprayers 7).

To this end, the method implemented by the lighter-than-air aircraft 1 comprises adjusting a flow rate of the liquid 3 sprayed by the at least one sprayer 7, and/or adjusting a direction of spraying of the liquid 3 sprayed by the at least one sprayer 7. The method implemented by the lighter-than-air aircraft 1 preferably also comprises a control of the adjustment of the flow rate of the liquid 3 sprayed by the at least one sprayer 7, and/or of the adjustment of the direction of spraying of the liquid 3 sprayed by the at least one sprayer 7 according to commands (originating from the control means) for the adjustment of a spatial position of the lighter-than-air aircraft 1, via control means arranged in order to control the flow rate adjuster 8 and the direction adjuster 9 of each sprayer 7.

Figure 3:
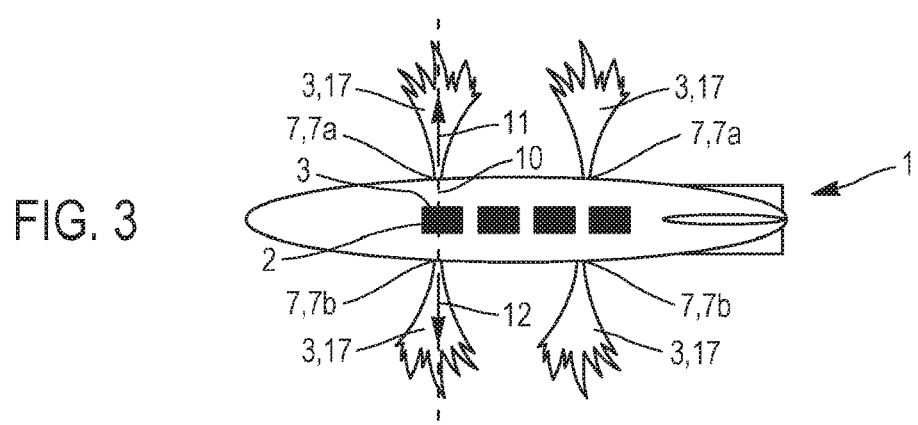
Figure 4:
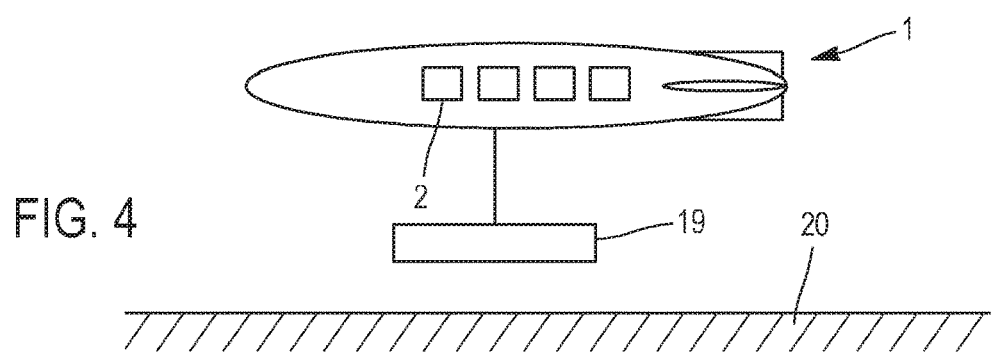

With reference to FIG. 3 ("symmetrical use") the lighter-than-air aircraft 1 comprises at least one pair of sprayers 7a, 7b, also known as "adjustment pair".

Each pair of sprayers 7a, 7b comprises:
  a first sprayer 7a arranged in order to spray the liquid 3 in a first direction of spraying 11 comprising a horizontal component (i.e. perpendicular to the direction of the earth's gravitational pull on the lighter-than-air aircraft 1) and
  a second sprayer 7b arranged in order to spray the liquid 3 in a second direction of spraying 12 comprising a non-zero horizontal component.

For each pair of sprayers 7a, 7b there is:
  at least one position of the direction adjuster 9 of each sprayer of this pair for which the horizontal components of the first 11 and second 12 directions of spray are opposite and carried on one and the same axis 10, and
  at least one position of the flow rate adjuster 8 of each sprayer of this pair for which the value of the force exerted on the lighter-than-air aircraft 1 by spraying the liquid 3 via the first sprayer 7a of this pair is equal to the value of the force exerted on the lighter-than-air aircraft 1 by spraying the liquid 3 via the second sprayer 7b of this pair.

The step, shown in FIG. 3, of the method implemented by the lighter-than-air aircraft 1 corresponds to these positions of the direction adjusters 9 and flow rate adjusters 8 for which the first sprayer 7a sprays the liquid 3 in the first direction of spraying 11 and the second sprayer 7b sprays the liquid 3 in the second direction of spraying 12 (preferably with one and the same force).

By "direction of spraying" of a sprayer 7, 7a or 7b is meant opposite to the direction of the force exerted on the lighter-than-air aircraft 1 by expelling or spraying the liquid 3 via this sprayer.

Thus, according to this "symmetrical" use, the sprayers 7 make it possible to discharge the liquid 3 rapidly and powerfully around the lighter-than-air aircraft 1 in a symmetrical fashion if the intention is to disturb the positioning of the lighter-than-air aircraft 1 only slightly, or not at all.

In certain specific cases:
  (for example directions of spray 11, 12 that are strictly horizontal), for each sprayer pair 7a, 7b, there is at least one position of the direction adjuster 8 of each sprayer of this pair for which the first and second directions of spray 11, 12 are opposite and carried on one and the same axis 10, or
  the directions of spray 11, 12 are oblique (i.e. with a non-zero horizontal component) also with a non-zero component oriented downwards (downwards being oriented in the direction of the earth's gravitational pull), which makes it possible to lift the lighter-than-air aircraft 1 slightly during its deballasting, or
  preferably the directions of spray 11, 12 are oblique (i.e. with a non-zero horizontal component) also with a non-zero component oriented upwards (upwards being oriented in a direction opposite to the direction of the earth's gravitational pull), which makes it possible to discharge the liquid 3 as far as possible from the lighter-than-air aircraft 1, and thus as widely diffused as possible, so as to minimize the effects of erosion or the effect on the personnel on the ground 20.

It is noted that, in a more general case, the forces of the two sprayers 7a, 7b of a pair are not necessarily equal, in particular if the control means take account of a wind, the effect of which it is sought to compensate.

Similarly, it is possible for the horizontal components not to be carried on the same axis 10, for example according to this wind direction.

Similarly, with reference to FIGS. 5 to 8, a controlled use (known as "non-symmetrical") of the spraying of the liquid 3 by the (preferably at least four) sprayers 7, via the control means arranged in order to control the flow rate adjuster 8 and the direction adjuster 9 of each sprayer 7, can participate in the position control of the lighter-than-air aircraft 1, preferably above its load 19.

The individual management of the nozzle openings of the sprayers 7 and of their orientations can thus be of considerable assistance in positioning.

Figure 5:
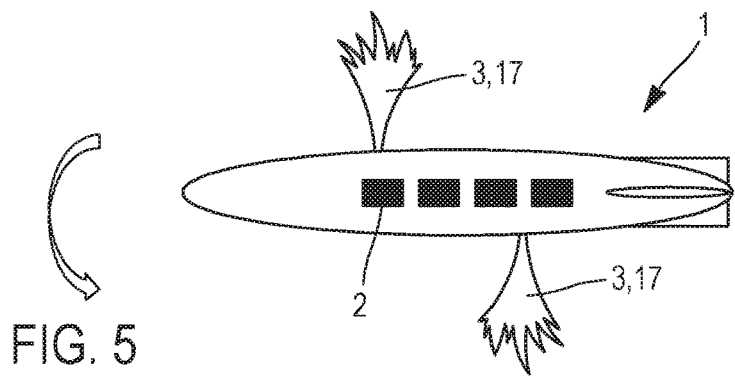

FIG. 5 shows how a controlled non-symmetrical use of the spraying via the sprayers 7 can make the lighter-than-air aircraft 1 (seen from above) turn to the left.

Figure 6:
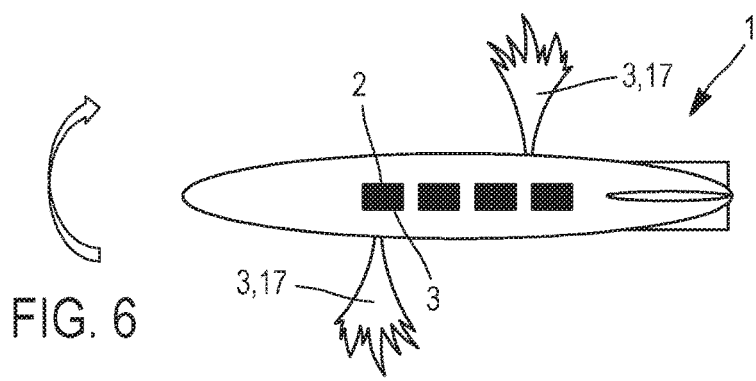

FIG. 6 shows how a controlled non-symmetrical use of the spraying via the sprayers 7 can make the lighter-than-air aircraft 1 (seen from above) turn to the right.

Figure 7:
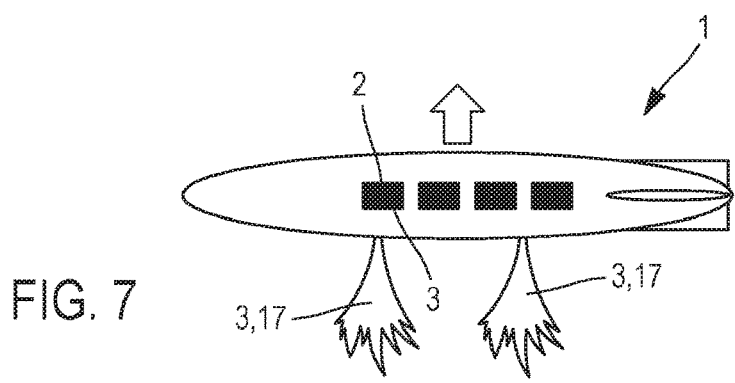

FIG. 7 shows how a controlled non-symmetrical use of the spraying via the sprayers 7 can make the lighter-than-air aircraft 1 (seen from above) move to the right. It is well understood that using the same principle, it would be possible to make the lighter-than-air aircraft 1 move to the left.

Figure 8:
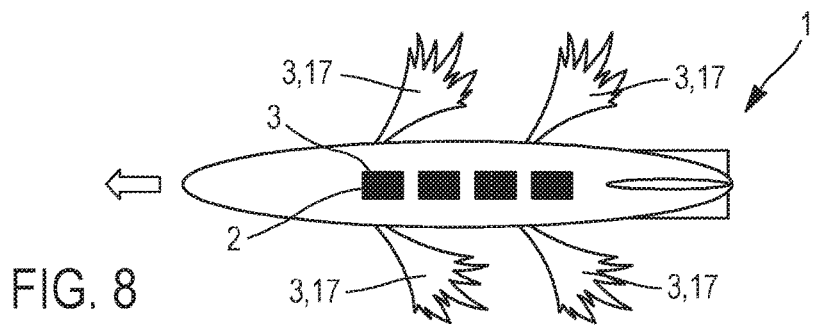

FIG. 8 shows how a controlled non-symmetrical use of the spraying via the sprayers 7 can make the lighter-than-air aircraft 1 (seen from above) move forward. It is well understood that using the same principle, it would be possible to make the lighter-than-air aircraft 1 move backward.

It is well understood that it is possible to combine all or part of the position adjustments described above with reference to FIGS. 5 to 8.

Of course, the invention is not limited to the examples that have just been described and numerous amendments can be made to these examples without exceeding the scope of the invention.

It is well understood that the different characteristics, forms, variants and embodiments of the invention can be combined together in different combinations, to the extent that they are not incompatible or mutually exclusive. In particular, all the variants and embodiments previously described can be combined together.

The invention claimed is:

1. A lighter-than-air aircraft comprising: deballasting means, the deballasting means comprising:
    at least one tank containing a liquid;
    a pressurization system configured to pressurize the liquid of the at least one tank; and
    at least one sprayer arranged to expel the liquid originating from the pressurization system,
    wherein said at least one sprayer is equipped with a direction adjuster arranged to adjust a direction of spraying of the liquid expelled by said at least one sprayer.

2. The lighter-than-air aircraft according to claim 1, wherein the pressurization system comprises at least one pump arranged to pump the liquid out of the at least one tank.

3. The lighter-than-air aircraft according to claim 1, wherein the pressurization system comprises the at least one tank containing the liquid stored under pressure.

4. The lighter-than-air aircraft according to claim 1, wherein the at least one sprayer is arranged to expel the liquid in a direction of spraying comprising a non-zero vertical component directed upwards.

5. The lighter-than-air aircraft according to claim 1, wherein the at least one sprayer comprises at least one pair of sprayers, each pair of sprayers comprising a first sprayer arranged to expel the liquid in a first direction of spraying comprising a first horizontal component, and a second sprayer arranged to expel the liquid in a second direction of spraying comprising a second horizontal component, the first and second horizontal components of the first and second directions of spraying being opposite and being on the same axis.

6. The lighter-than-air aircraft according to claim 1, further comprising several tanks and transferring means for transferring liquid from one of said tanks to another of said tanks.

7. The lighter-than-air aircraft according to claim 1, further comprising controlling means for controlling each direction adjuster according to commands for the adjustment of a spatial position of the lighter-than-air aircraft.

8. The lighter-than-air aircraft according to claim 1, wherein the at least one sprayer is arranged to expel the liquid in a direction of spraying comprising a non-zero horizontal component.

9. The lighter-than-air aircraft according to claim 1, further comprising a flow-rate adjuster arranged to adjust a flow rate of the liquid expelled by this sprayer.

10. The lighter-than-air aircraft according to claim 9, further comprising controlling means for controlling the flow-rate adjuster according to commands for the adjustment of a spatial position of the lighter-than-air aircraft.

11. A deballasting method implemented in a lighter-than-air aircraft comprising at least one tank containing a liquid, the method comprising:
    pressurizing the liquid of the at least one tank, by a pressurization system;
    expelling the liquid originating from the pressurization system via at least one sprayer; and
    adjusting a direction of spraying of the liquid expelled by the at least one sprayer.

* * * * *